United States Patent
Lindemeier

(10) Patent No.: US 9,120,466 B2
(45) Date of Patent: Sep. 1, 2015

(54) SCRAPER ASSEMBLY FOR AN OFF-ROAD VEHICLE

(71) Applicant: CNH Industrial America LLC, New Holland, PA (US)

(72) Inventor: Randy Allan Lindemeier, Willmar, MN (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/212,133

(22) Filed: Mar. 14, 2014

(65) Prior Publication Data

US 2014/0265293 A1    Sep. 18, 2014

Related U.S. Application Data

(60) Provisional application No. 61/792,766, filed on Mar. 15, 2013.

(51) Int. Cl.
*B60S 1/68* (2006.01)

(52) U.S. Cl.
CPC .......................................... *B60S 1/68* (2013.01)

(58) Field of Classification Search
CPC ........................................................ B60S 1/68
USPC ............................. 280/856, 855; 305/107, 110
See application file for complete search history.

(56) References Cited

U.S. PATENT DOCUMENTS

| 1,602,492 | A |   | 10/1926 | James et al. |
|---|---|---|---|---|
| 1,753,992 | A |   | 4/1930 | Larson et al. |
| 2,077,919 | A |   | 4/1937 | Engstrom |
| 2,356,292 | A |   | 8/1944 | Wildman |
| 2,509,807 | A |   | 5/1950 | Carlton |
| 2,823,928 | A |   | 2/1958 | Dahlstrom |
| 2,839,313 | A |   | 6/1958 | Walko |
| 3,085,484 | A |   | 4/1963 | McAdams et al. |
| 3,259,036 | A |   | 7/1966 | Peterson et al. |
| 3,913,943 | A |   | 10/1975 | Tamburino et al. |
| 4,334,694 | A | * | 6/1982 | Iwanicki ........................ 280/851 |
| 5,360,288 | A |   | 11/1994 | O'Neill et al. |
| 5,611,157 | A | * | 3/1997 | Ferreira .......................... 37/449 |
| 7,131,670 | B2 | * | 11/2006 | Kinoshita ..................... 280/856 |
| 7,591,515 | B2 |   | 9/2009 | Breton et al. |

FOREIGN PATENT DOCUMENTS

JP       H04118853       10/1992

* cited by examiner

*Primary Examiner* — Brodie Follman
*Assistant Examiner* — Brian Cassidy
(74) *Attorney, Agent, or Firm* — Patrick M. Sheldrake; Seyed V. Sharifi T.

(57) ABSTRACT

A scraper assembly includes a first scraping member configured to be positioned below a horizontal centerline of a rotating assembly and rearward of a vertical centerline of the rotating assembly. The first scraping member is configured to remove debris from the rotating assembly at least while the rotating assembly is rotating in a first direction. The scraper assembly also includes a second scraping member configured to be positioned above the horizontal centerline of the rotating assembly and forward of the vertical centerline of the rotating assembly. The second scraping member is configured to remove debris from the rotating assembly at least while the rotating assembly is rotating in a second direction, opposite the first direction. In addition, the scraper assembly includes a support structure configured to couple to a frame of an off-road vehicle, and the first and second scraping members are coupled to the support structure.

18 Claims, 6 Drawing Sheets

SCRAPER ASSEMBLY FOR AN OFF-ROAD VEHICLE

CROSS REFERENCE TO RELATED APPLICATION

This application claims priority from and the benefit of U.S. Provisional Application Ser. No. 61/792,766, entitled "SCRAPER ASSEMBLY FOR AN OFF-ROAD VEHICLE", filed Mar. 15, 2013, which is hereby incorporated by reference in its entirety.

BACKGROUND

The invention relates generally to a scraper assembly for an off-road vehicle.

Certain off-road vehicles, such as agricultural vehicles (e.g., harvesters, tractors, combines, cotton pickers, etc.), include one or more dual wheel assemblies. A dual wheel assembly typically includes two wheels and a rotating assembly configured to support the wheels on opposite lateral sides of the rotating assembly. The rotating assembly generally includes a first rim coupled to a first wheel, a second rim coupled to a second wheel, and/or an extension extending between the rims. Certain off-road vehicles include a scraper assembly configured to remove debris (e.g., soil, agricultural residue, rocks, etc.) from the rotating assembly. Certain scraper assemblies include a support structure coupled to the frame of the off-road vehicle and a scraping member coupled to the support structure. The scraping member is typically positioned below a horizontal centerline of the rotating assembly and configured to engage the rotating assembly to remove accumulated debris. Unfortunately, rearward movement of the off-road vehicle may cause debris to accumulate on the scraper assembly. The weight of the accumulated debris may deflect the scraper assembly downwardly relative to the rotating assembly. As a result, the effectiveness of the scraping member may be substantially reduced.

BRIEF DESCRIPTION

In one embodiment, a scraper assembly for an off-road vehicle includes a first scraping member configured to be positioned below a horizontal centerline of a rotating assembly and rearward of a vertical centerline of the rotating assembly. The first scraping member is configured to remove debris from the rotating assembly at least while the rotating assembly is rotating in a first direction. The scraper assembly also includes a second scraping member configured to be positioned above the horizontal centerline of the rotating assembly and forward of the vertical centerline of the rotating assembly. The second scraping member is configured to remove debris from the rotating assembly at least while the rotating assembly is rotating in a second direction, opposite the first direction. In addition, the scraper assembly includes a support structure configured to couple to a frame of the off-road vehicle, and the first and second scraping members are coupled to the support structure.

In another embodiment, a scraper assembly for an off-road vehicle includes an arcuate support structure configured to couple to a frame of the off-road vehicle. The arcuate support structure is configured to extend at least partially about a rotating assembly, a first end of the arcuate support structure is configured to be positioned below a horizontal centerline of the rotating assembly and rearward of a vertical centerline of the rotating assembly, and a second end of the arcuate support structure is configured to be positioned above the horizontal centerline of the rotating assembly and forward of the vertical centerline of the rotating assembly. The scraper assembly also includes a first scraping member coupled to the arcuate support structure proximate to the first end. The first scraping member is configured to remove debris from the rotating assembly at least while the rotating assembly is rotating in a first direction. In addition, the scraper assembly includes a second scraping member coupled to the arcuate support structure proximate to the second end. The second scraping member is configured to remove debris from the rotating assembly at least while the rotating assembly is rotating in a second direction, opposite the first direction.

In a further embodiment, a scraper assembly for an off-road vehicle includes a support structure configured to couple to a frame of the off-road vehicle. The support structure is configured to be positioned between a first wheel and a second wheel, and the support structure is configured to extend at least partially about a rotating assembly that supports the first wheel and the second wheel. The scraper assembly also includes a first scraping member coupled to the support structure. The first scraping member is configured to be positioned below a horizontal centerline of the rotating assembly and rearward of a vertical centerline of the rotating assembly, and the first scraping member is configured to remove debris from the rotating assembly at least while the rotating assembly is rotating in a first direction. In addition, the scraper assembly includes a second scraping member coupled to the support structure. The second scraping member is configured to be positioned above the horizontal centerline of the rotating assembly and forward of the vertical centerline of the rotating assembly, and the second scraping member is configured to remove debris from the rotating assembly at least while the rotating assembly is rotating in a second direction, opposite the first direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
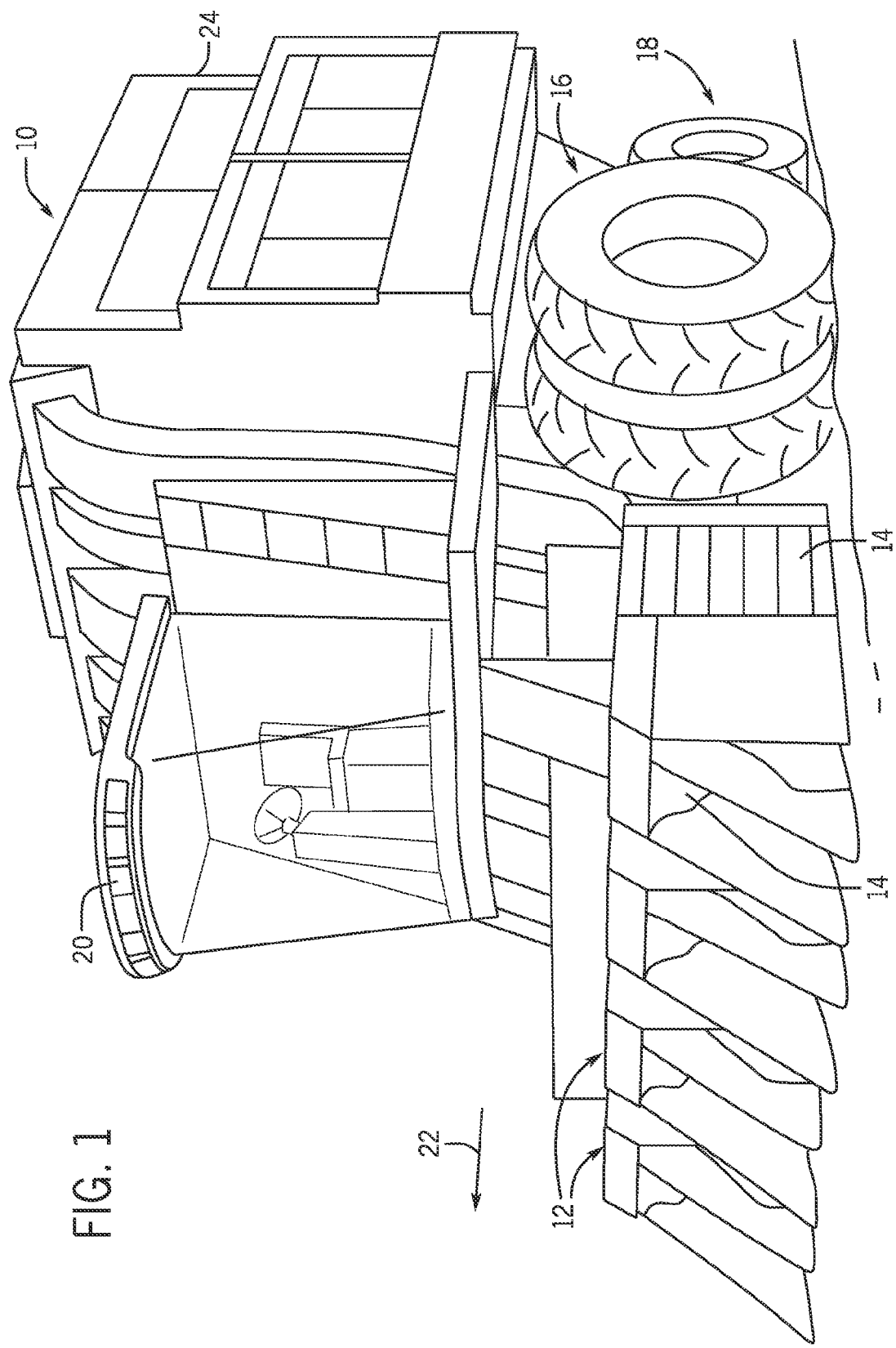
FIG. 1 is a perspective view of an exemplary off-road vehicle having an embodiment of a scraper assembly configured to remove debris from a rotating assembly.

FIG. 1 is a perspective view of an exemplary off-road vehicle having an embodiment of a scraper assembly configured to remove debris from a rotating assembly. In the illustrated embodiment, the off-road vehicle is a harvester 10 configured to harvest a row of crops. The harvester 10 includes drums 12 (e.g., harvesting heads) each configured to harvest crops, such as cotton, via one or more rotors 14. As illustrated, the harvester 10 include front wheel assemblies 16 and rear wheel assemblies 18. In the illustrated embodiment, the front wheel assemblies 16 are configured to propel the harvester 10 through a field, thereby enabling the drums 12 to harvest the crops. The harvester 10 also includes a cab 20, which may include an interface having controls for operating the harvester 10. In some embodiments, controls in the cab 20 enable the operator to adjust a speed of the harvester 10 and/or to steer the harvester 10. Displays and/or indicators in the cab 20 may provide feedback to the operator regarding the position of the harvester 10 and/or the operational status of various systems within the harvester 10.

The drums 12 extend from the harvester 10 substantially parallel to a forward direction of travel 22 across the field. The drums 12 remove portions of the crops of each row and transfer harvested goods (e.g., cotton) to a bin 24, basket, or baler positioned behind the drums 12. Other agricultural materials (e.g., foliage, stems, debris, detritus) may be expelled through outlets in the drums onto the field beneath and/or behind the harvester 10. In some embodiments, the displays and/or indicators in the cab 20 may provide feedback to the operator regarding a level of the harvested good (e.g., cotton) in the bin 24, an operational status of a conveyor to the bin, and/or an operational status of the rotors 14. As discussed herein, the term bin 24 may include, but is not limited to, a basket, a baler, a reservoir, or a receptacle to receive the harvested good. The bin 24 may be the part of the harvester 10, part of a separate implement, or part of another vehicle.

As discussed in detail below, the front wheel assembly 16 includes two wheels and a rotating assembly configured to support the wheels on opposite lateral sides of the rotating assembly. As the harvester 10 traverses the field along the forward direction of travel 22, debris (e.g., soil, agricultural residue, rocks, etc.) may accumulate on the rotating assembly between the wheels. Accordingly, in certain embodiments, the harvester 10 includes a scraper assembly configured to remove debris from the rotating assembly as the harvester 10 traverses the field. For example, in certain embodiments, the scraper assembly includes a support structure configured to couple to a frame of the harvester 10. The scraper assembly also includes a first scraping member coupled to the support structure and positioned below a horizontal centerline of the rotating assembly and rearward of a vertical centerline of the rotating assembly. The position of the first scraping member enables the scraping member to remove debris from the rotating assembly at least while the rotating assembly is rotating in a first direction (e.g., while the harvester is moving in the forward direction of travel 22). The scraper assembly also includes a second scraping member coupled to the support structure and positioned above the horizontal centerline of the rotating assembly and forward of the vertical centerline of the rotating assembly. The position of the second scraping member enables the scraping member to remove debris from the rotating assembly at least while the rotating assembly is rotating in a second direction, opposite the first direction (e.g., while the harvester is moving in a rearward direction of travel).

Because the scraper assembly is configured to remove debris from the rotating assembly as the rotating assembly rotates in both the first and second directions, debris accumulation on the scraper assembly may be substantially reduced. For example, as the harvester 10 moves in the rearward direction, rotation of the rotating assembly 34 may transfer debris from the rotating assembly to the scraper assembly. However, because the second scraping member removes debris from the rotating assembly as the harvester moves in the rearward direction, accumulation of debris on the scraper assembly may be substantially reduced, as compared to configurations that do not have the second scraping member. As a result, the possibility of debris accumulation deflecting the scraper assembly is substantially reduced or eliminated, thereby enhancing the effectiveness of the scraper assembly. While the scraper assembly is described herein with reference to a dual wheel harvester, it should be appreciated that the scraper assembly may be employed within other off-road vehicles. For example, the scraper assembly may be employed to remove debris from a rotating assembly of a tractor, an agricultural implement, a skid-steer loader, or an off-road recreational vehicle, among others.

Figure 2:
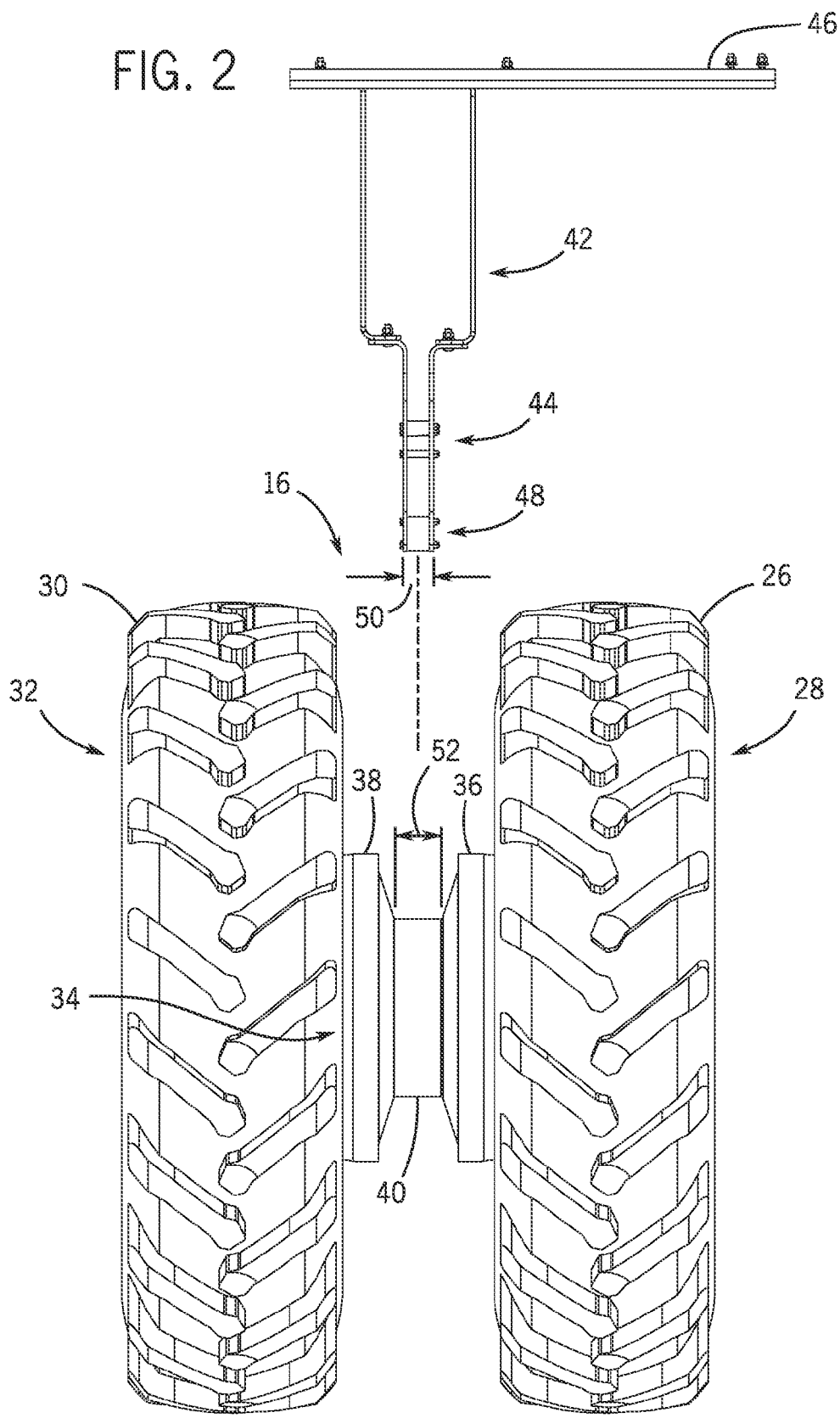
FIG. 2 is an exploded top view of an exemplary wheel assembly and an embodiment of a scraper assembly configured to remove debris from a rotating assembly of the wheel assembly.

FIG. 2 is an exploded top view of an exemplary wheel assembly and an embodiment of a scraper assembly configured to remove debris from a rotating assembly of the wheel assembly. As illustrated, the wheel assembly, such as the illustrated front wheel assembly 16, includes a first wheel 26 positioned on a first lateral side 28 of the wheel assembly 16, and a second wheel 30 positioned on a second lateral side 32 of the wheel assembly 16, opposite the first lateral side 28. The wheel assembly 16 also includes a rotating assembly 34 configured to support the first wheel 26 and the second wheel 30. In the illustrated embodiment, the rotating assembly 34 includes a first rim 36 coupled to the first wheel 26 and a second rim 38 coupled to the second wheel 30. As will be appreciated, the rims 36 and 38 are configured to support the wheels 26 and 30 and to facilitate rotation of the wheels about an axle. The rotating assembly 34 also includes an extension 40 that extends between the first rim 36 and the second rim 38. The extension 40 is configured to provide a desired spacing between the wheels 26 and 30. As discussed in detail below, the extension 40 may be omitted if a narrow spacing between the wheels is desired.

In the illustrated embodiment, the harvester 10 includes a scraper assembly 42 configured to remove debris from the rotating assembly 34. As illustrated, the scraper assembly 42 includes a support structure 44 coupled to a frame 46 of the harvester 10. In the illustrated embodiment, the support structure 44 is configured to be positioned between the first wheel 26 and the second wheel 30, thereby enabling the scraper assembly to remove debris from the rotating assembly 34. The scraper assembly 42 also includes multiple scraping members 48 coupled to the support structure 44. As discussed in detail below, a first scraping member is positioned below a horizontal centerline of the rotating assembly and rearward of a vertical centerline of the rotating assembly. In addition, a second scraping member is positioned above the horizontal centerline of the rotating assembly and forward of the vertical centerline of the rotating assembly. Accordingly, the first scraping member is configured to remove debris from the rotating assembly at least while the harvester 10 is moving in a forward direction of travel, and the second scraping member is configured to remove debris from the rotating assembly at least while the harvester is moving in a rearward direction of travel. Because the scraper assembly is configured to remove debris from the rotating assembly while the harvester is traveling in a forward direction and in a rearward direction, debris accumulation on the rotating assembly and/or on the scraper assembly is substantially reduced, as compared to scraper assemblies that only include the first scraping member. As a result, the possibility of debris accumulation deflecting the structural support is substantially reduced or eliminated, thereby enhancing the effectiveness of the scraper assembly.

In the illustrated embodiment, the wheel assembly 16 is configured to support a harvester 10 having wide row spacing. Accordingly, the rotating assembly 34 includes an extension 40 configured to provide a desired spacing between the wheels 26 and 30. In addition, the scraping members 48 are configured to remove debris from the extension 40. As illustrated, a width of the scraping members 50 is substantially equal to a width 52 of the extension 40. Therefore, the scraping members 48 may engage and remove debris from the extension 40 as the harvester traverses a field. In alternative embodiments, the wheel assembly 16 may be configured to support a harvester 10 having narrow row spacing. Accordingly, the width 52 of the extension may be reduced or the extension 40 may be omitted. In such embodiments, the scraping members 48 are configured to remove debris from the first rim 36 and/or from the second rim 38 as the harvester traverses a field.

Figure 3:
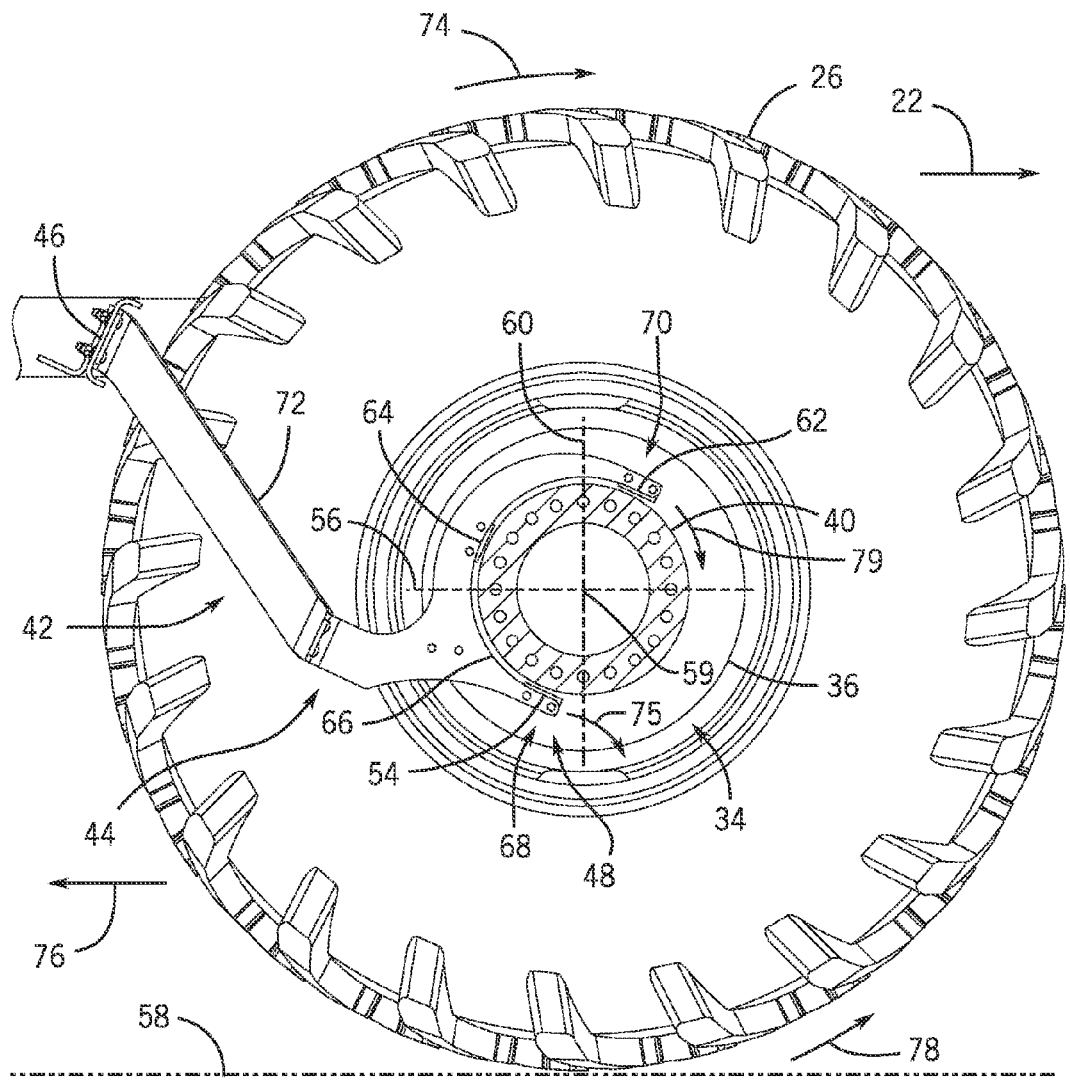
FIG. 3 is a side view of the scraper assembly of FIG. 2.

FIG. 3 is a side view of the scraper assembly 42 of FIG. 2. In the illustrated embodiment, the wheel assembly is configured to support a harvester 10 having wide row spacing. Accordingly, the scraper assembly 42 is configured to remove debris from the extension 40. As illustrated, the first scraping member 54 is positioned below a horizontal centerline 56 of the rotating assembly 34. The horizontal centerline 56 extends through an axis of rotation 57 of the rotating assembly 34 and is oriented substantially parallel to a surface 58 of the ground. In addition, the first scraping member 54 is positioned rearward of a vertical centerline 60 of the rotating assembly 34. The vertical centerline 60 extends through the axis of rotation 57 of the rotating assembly 34 and is oriented substantially perpendicular to the surface 58 of the ground. Accordingly, the first scraping member 54 is positioned between the horizontal centerline 56 and the surface 58 of the ground, and the first scraping member 54 is positioned rearward of the vertical centerline 60 relative to the forward direction of travel 22.

Furthermore, the second scraping member 62 is positioned above the horizontal centerline 56 and forward of the vertical centerline 60. Accordingly, the second scraping member 62 is positioned on an opposite side of the horizontal centerline 56 from the surface 58 of the ground, and the second scraping member 62 is positioned forward of the vertical centerline 60 relative to the direction of travel 22. In the illustrated embodiment, the scraper assembly 42 also includes a third scraping member 64 positioned between the first scraping member 54 and the second scraping member 62. While the illustrated scraper assembly 42 includes three scraping members, it should be appreciated that the scraper assembly 42 may include more or fewer scraping members 48 in alternative embodiments. For example, in certain embodiments, the scraper assembly 42 may include 2, 3, 4, 5, 6, or more scraping members 48.

In the illustrated embodiment, the scraping members 48 are coupled to a first support assembly 66 of the support structure 44, which extends at least partially about the rotating assembly 34. As illustrated, the first scraping member 54 is coupled to the first support assembly 66 proximate to a first end 68 of the first support assembly 66, and the second scraping member 62 is coupled to the first support assembly 66 proximate to a second end 70 of the first support assembly 66. Accordingly, the first end 68 of the first support assembly 66 is positioned below the horizontal centerline 56 and rearward of the vertical centerline 60, and the second end 70 of the first support assembly 66 is positioned above the horizontal centerline 56 and forward of the vertical centerline 60. In the illustrated embodiment, the first support assembly 66 is substantially arcuate and substantially matches the curvature of the extension 40. However, it should be appreciated that the first support assembly 66 may be formed into other shapes in alternative embodiments.

In the illustrated embodiment, the support structure 44 includes a second support assembly 72 that extends between the first support assembly 66 and the frame 46 of the harvester 10. The second support assembly 72 is configured to support the weight of the first support assembly 66 and the scraping members 48. The second support assembly 72 is also configured to resist torque applied to the first support assembly 66 by contact between the scraping members 48 and debris. As discussed in detail below, a width of the second support assembly 72 may be particularly selected to accommodate the wheel spacing of the wheel assembly 16 and to provide sufficient lateral support to the scraper assembly 42.

In the illustrated embodiment, the scraping members 48 are configured to remove debris from the rotating assembly 34 via contact with the rotating assembly 34. Accordingly, each scraping member may be formed from an abradable (e.g., wearable) material, such as a polymeric material (e.g., plastic). The abradable material substantially reduces wear on the rotating assembly 34 during operation of the harvester 10. As previously discussed, the first scraping member 54 is configured to remove debris from the extension 40 as the harvester 10 moves in the forward direction of travel 22. As illustrated, rotation of the wheels in a first direction 74 drives the harvester 10 to move in the forward direction of travel 22. As the wheels rotate in the direction 74, debris may accumulate on the extension 40. However, contact between the first scraping member 54 and the extension 40 removes a substantial portion of the accumulated debris, thereby reducing debris accumulation of the rotating assembly 34. Because the first scraping member 54 is positioned below the horizontal centerline 56 and rearward of the vertical centerline 60, the first scraping member 54 contacts the rotating assembly 34 at an upwardly moving point on the rotating assembly 34. Accordingly, as the debris is removed from the rotating assembly 34, gravity directs the debris downwardly in a direction 75. As a result, the debris is directed away from the scraper assembly 42, thereby substantially reducing debris accumulation on the scraper assembly 42.

In addition, the second scraping member 62 is configured to remove debris from the extension 40 as the harvester 10 moves in a rearward direction of travel 76. As illustrated, rotation of the wheels in a second direction 78 drives the harvester 10 to move in the rearward direction of travel 76. As the wheels rotate in the direction 78, debris may accumulate on the extension 40. However, contact between the second scraping member 62 and the extension 40 removes a substantial portion of the accumulated debris, thereby reducing debris accumulation of the rotating assembly 34. Because the second scraping member 62 is positioned above the horizontal centerline 56 and forward of the vertical centerline 60, the second scraping member 62 contacts the rotating assembly 34 at an upwardly moving point on the rotating assembly 34. Accordingly, as the debris is removed from the rotating assembly 34, gravity directs the debris downwardly in a direction 79. As a result, the debris is directed away from the scraper assembly 42, thereby substantially reducing debris accumulation on the scraper assembly 42.

Furthermore, the third scraping member 64 may enhance debris removal from the rotating assembly, and may serve as a guide to facilitate alignment between the scraper assembly 42 and the rotating assembly 34. Because the scraping members 48 remove debris from the rotating assembly 34, debris accumulation on the scraper assembly 42 may be substantially reduced. As a result, the possibility of structural support deflection is substantially reduced or eliminated, thereby enhancing the effectiveness of the scraper assembly.

Figure 4:
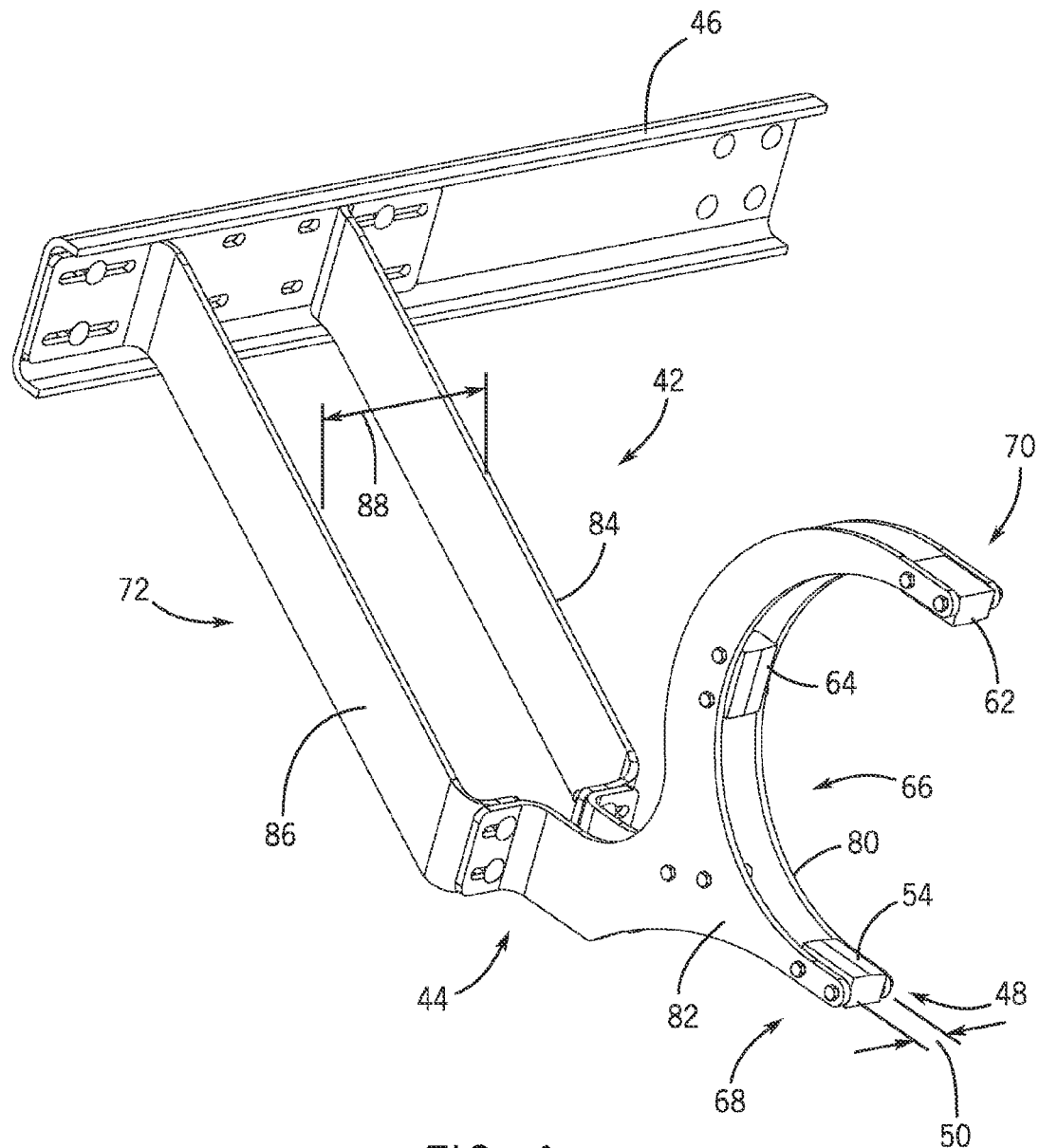
FIG. 4 is a perspective view of the scraper assembly of FIG. 2.

FIG. 4 is a perspective view of the scraper assembly of FIG. 2. In the illustrated embodiment, the first support assembly 66 includes a first arcuate member 80 and a second arcuate member 82. The first and second arcuate members are substantially aligned with one another, and the first and second arcuate members are laterally offset from one another. As illustrated, the first scraping member 54, the second scraping member 62, and the third scraping member 64 are secured between the first and second arcuate members. In this configuration, the scraping members may be aligned within an extension to facilitate debris removal from a rotating assembly of a wide-row wheel assembly. In certain embodiments, each scraping member may be secured to the arcuate members by one or more fasteners (e.g., bolts, screws, rivets, etc.). As previously discussed, each scraping member may be formed from an abradable material. Accordingly, the fasteners may be configured to facilitate removal and replacement of worn scraping members.

In the illustrated embodiment, the second support assembly 72 includes a first support 84 and a second support 86. The first support 84 extends from the harvester frame 46 to the first arcuate member 80, and the second support 86 extends from the harvester frame 46 to the second arcuate member 82. Accordingly, the second support assembly 72 supports the first support assembly 66 during operation of the harvester. Furthermore, a width 88 of the second support assembly 72 may be particularly selected to accommodate the wheel spacing of the wheel assembly 16. That is, the width 88 of the second support assembly 72 may be less than the spacing between wheels of the wide-row wheel assembly 16. In addition, the width 88 may be particularly selected to provide sufficient lateral support to the support structure 44, thereby enabling the scraper assembly 42 to resist lateral loading.

Figure 5:
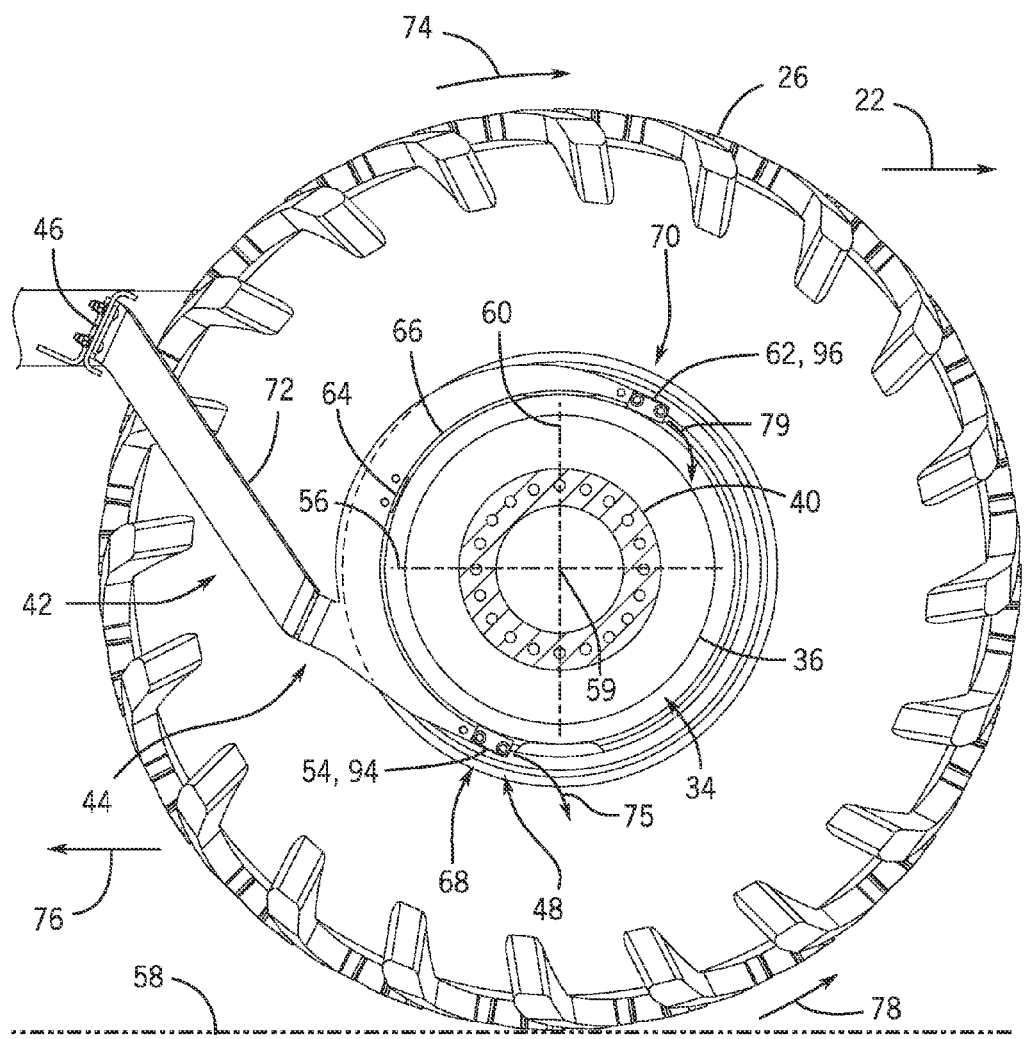
FIG. 5 is a side view of another embodiment of a scraper assembly configured to remove debris from a rotating assembly.

FIG. 5 is a side view of another embodiment of a scraper assembly 42 configured to remove debris from a rotating assembly 34. In the illustrated embodiment, the wheel assembly is configured to support a harvester 10 having narrow row spacing. Accordingly, the scraper assembly 42 is configured to remove debris from the rims 36 and 38. Similar to the scraper assembly described above with reference to FIGS. 3-4, the first scraping member 54 is positioned below the horizontal centerline 56 of the rotating assembly 34 and rearward of the vertical centerline 60 of the rotating assembly 34. In addition, the second scraping member 62 is positioned above the horizontal centerline 56 and forward of the vertical centerline 60. In the illustrated embodiment, the scraper assembly 42 also includes a third scraping member 64 positioned between the first scraping member 54 and the second scraping member 62. While the illustrated scraper assembly 42 includes three scraping members, it should be appreciated that the scraper assembly 42 may include more or fewer scraping members 48 in alternative embodiments. For example, in certain embodiments, the scraper assembly 42 may include 2, 3, 4, 5, 6, or more scraping members 48.

As illustrated, rotation of the wheels in the first direction 74 drives the harvester 10 to move in the forward direction of travel 22. As the wheels rotate in the direction 74, debris may accumulate on the rim 36. However, contact between the first scraping member 54 and the rim 36 removes a substantial portion of the accumulated debris, thereby reducing debris accumulation of the rotating assembly 34. Because the first scraping member 54 is positioned below the horizontal centerline 56 and rearward of the vertical centerline 60, the first scraping member 54 contacts the rim 36 at an upwardly moving point on the rotating assembly 34. Accordingly, as the debris is removed from the rotating assembly 34, gravity directs the debris downwardly in the direction 75. As a result, the debris is directed away from the scraper assembly 42, thereby substantially reducing debris accumulation on the scraper assembly 42.

In addition, the second scraping member 62 is configured to remove debris from the rim 36 as the harvester 10 moves in a rearward direction of travel 76. As illustrated, rotation of the wheels in the second direction 78 drives the harvester 10 to move in the rearward direction of travel 76. As the wheels rotate in the direction 78, debris may accumulate on the rim 36. However, contact between the second scraping member 62 and the rim 36 removes a substantial portion of the accumulated debris, thereby reducing debris accumulation of the rotating assembly 34. Because the second scraping member 62 is positioned above the horizontal centerline 56 and forward of the vertical centerline 60, the second scraping member 62 contacts the rim 36 at an upwardly moving point on the rotating assembly 34. Accordingly, as the debris is removed from the rotating assembly 34, gravity directs the debris downwardly in the direction 79. As a result, the debris is directed away from the scraper assembly 42, thereby substantially reducing debris accumulation on the scraper assembly 42.

While removing debris from the first rim 36 is described above, it should be appreciated that the scraper assembly 42 may include additional scraping members (e.g., symmetrical with the first and second scraping members) to remove debris from the second rim 38. Furthermore, the third scraping member 64 may enhance debris removal from the rotating assembly, and may serve as a guide to facilitate alignment between the scraper assembly 42 and the rotating assembly 34. Because the scraping members 48 remove debris from the rotating assembly 34, debris accumulation on the scraper assembly 42 may be substantially reduced. As a result, the possibility of structural support deflection is substantially reduced or eliminated, thereby enhancing the effectiveness of the scraper assembly.

Figure 6:
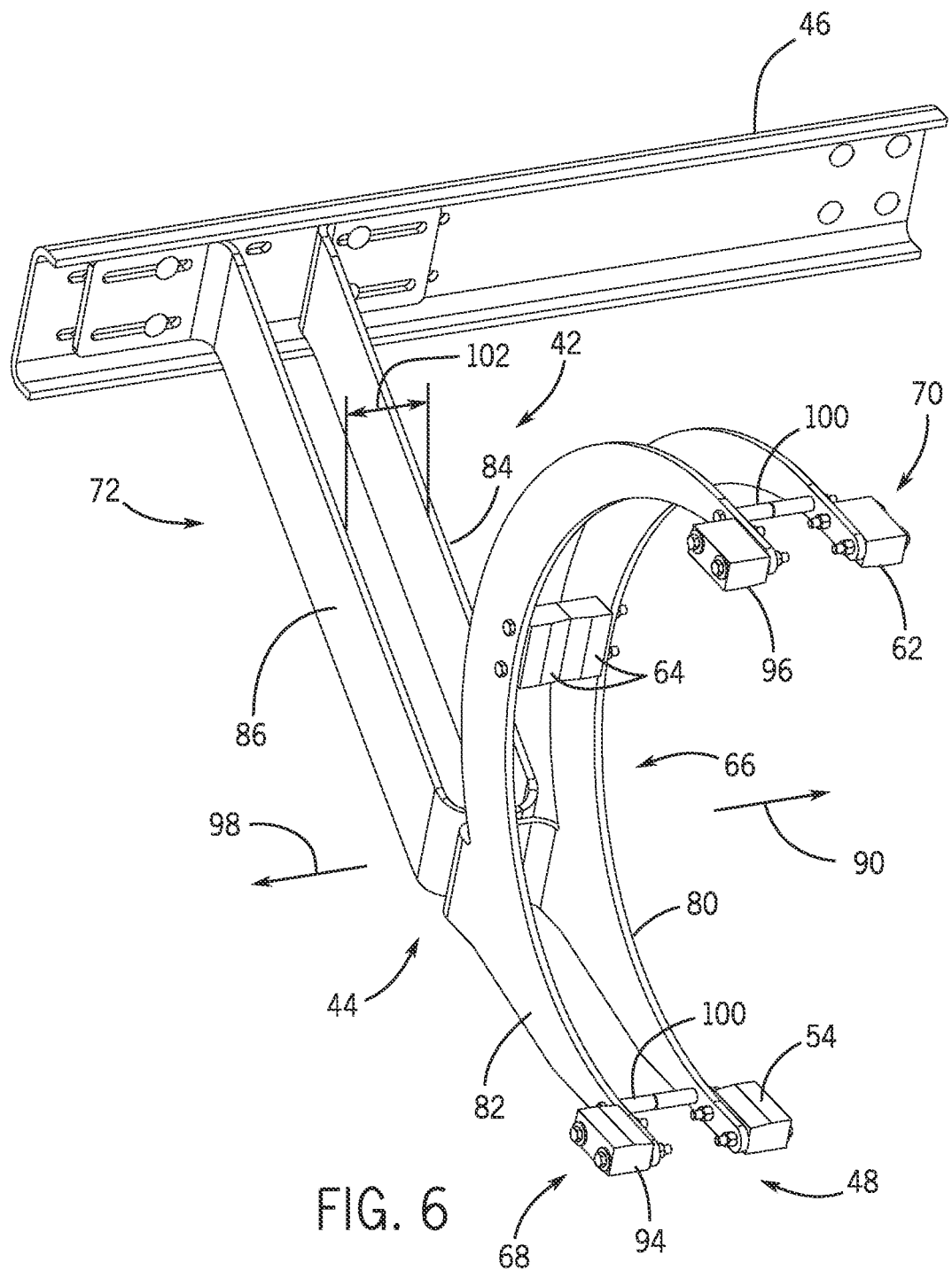
FIG. 6 is a perspective view of the scraper assembly of FIG. 5.

FIG. 6 is a perspective view of the scraper assembly of FIG. 5. In the illustrated embodiment, the first support assembly 66 includes the first arcuate member 80 and the second arcuate member 82. The first and second arcuate members are substantially aligned with one another, and the first and second arcuate members are laterally offset from one another. As illustrated, the third scraping member 64 is secured between the first and second arcuate members. However, the first scraping member 54 and the second scraping member 62 are secured to the first arcuate member 80 and extend outwardly from the first arcuate member 80 in a first lateral direction 90.

In this configuration, the first and second scraping members may be aligned with the first rim 36.

In the illustrated embodiment, the scraper assembly 42 also includes a fourth scraping member 94 secured to the second arcuate member 82 proximate to the first end 68 of the first support assembly 66. In addition, the scraper assembly 42 includes a fifth scraping member 96 secured to the second arcuate member 82 proximate to the second end 70 of the first support assembly 66. As illustrated, the fourth and fifth scraping members extend outwardly from the second arcuate member 82 in a second lateral direction 98, opposite the first lateral direction 90. In this configuration, the fourth and fifth scraping members may be aligned with the second rim 38. As a result, the scraping members are configured to facilitate debris removal from each rim of a narrow-row wheel assembly. Similar to the embodiment described above with reference to FIGS. 3-4, each scraping member may be secured to the arcuate members by one or more fasteners (e.g., bolts, screws, rivets, etc.).

Because the first, second, fourth, and fifth scraping members are positioned laterally outward from the first support assembly 66, the scraper assembly 42 includes supports 100 to enhance the stability of the support structure 44. In the illustrated embodiment, a width 102 of the second support assembly 72 may be particularly selected to accommodate the wheel spacing of the wheel assembly 16. That is, the width 102 of the second support assembly 72 may be less than the spacing between wheels of the narrow-row wheel assembly 16. In addition, the width 102 may be particularly selected to provide sufficient lateral support to the support structure 44, thereby enabling the scraper assembly 42 to resist lateral loading.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A scraper assembly for an off-road vehicle comprising:
   a first scraping member configured to be positioned below a horizontal centerline of a rotating assembly and rearward of a vertical centerline of the rotating assembly, wherein the first scraping member is configured to remove debris from the rotating assembly at least while the rotating assembly is rotating in a first direction;
   a second scraping member configured to be positioned above the horizontal centerline of the rotating assembly and forward of the vertical centerline of the rotating assembly, wherein the second scraping member is configured to remove debris from the rotating assembly at least while the rotating assembly is rotating in a second direction, opposite the first direction;
   a support structure configured to couple to a frame of the off-road vehicle, wherein the first and second scraping members are coupled to the support structure; and
   a third scraping member coupled to the support structure and positioned between the first scraping member and the second scraping member.

2. The scraper assembly of claim 1, wherein the rotating assembly is configured to support a first wheel on a first lateral side of the rotating assembly and a second wheel on a second lateral side of the rotating assembly, opposite the first lateral side, and wherein the scraper assembly is configured to be positioned between the first wheel and the second wheel.

3. The scraper assembly of claim 2, wherein the rotating assembly comprises a first rim coupled to the first wheel and a second rim coupled to the second wheel.

4. The scraper assembly of claim 3, wherein the first and second scraping members are configured to remove debris from the first rim.

5. The scraper assembly of claim 4, comprising:
   a third scraping member coupled to the support structure and positioned laterally opposite from the first scraping member; and
   a fourth scraping member coupled to the support structure and positioned laterally opposite from the second scraping member;
   wherein the third and fourth scraping members are configured to remove debris from the second rim.

6. The scraper assembly of claim 3, wherein the rotating assembly comprises an extension extending between the first rim and the second rim, and wherein the first and second scraping members are configured to remove debris from the extension.

7. The scraper assembly of claim 1, wherein the first and second scraping members are configured to contact the rotating assembly while the rotating assembly is rotating in the first and second directions.

8. The scraper assembly of claim 7, wherein at least one of the first scraping member and the second scraping member is formed from an abradable material.

9. The scraper assembly of claim 1, wherein the support structure is substantially arcuate, the first scraping member is positioned proximate to a first end of the support structure, and the second scraping member is positioned proximate to a second end of the support structure.

10. A scraper assembly for an off-road vehicle comprising:
    an arcuate support structure configured to couple to a frame of the off-road vehicle, wherein the arcuate support structure is configured to extend at least partially about a rotating assembly, a first end of the arcuate support structure is configured to
    be positioned below a horizontal centerline of the rotating assembly and rearward of a vertical centerline of the rotating assembly, and a second end of the arcuate support structure is configured to be positioned above the horizontal centerline of the rotating assembly and forward of the vertical centerline of the rotating assembly;
    a first scraping member coupled to the arcuate support structure proximate to the first end, wherein the first scraping member is configured to remove debris from the rotating assembly at least while the rotating assembly is rotating in a first direction;
    a second scraping member coupled to the arcuate support structure proximate to the second end, wherein the second scraping member is configured to remove debris from the rotating assembly at least while the rotating assembly is rotating in a second direction, opposite the first direction; and
    a third scraping member secured to the second arcuate member proximate to the first end of the support structure.

11. The scraper assembly of claim 10, wherein the arcuate support structure comprises a first arcuate member and a second arcuate member, the first and second arcuate members are substantially aligned with one another, and the first and second arcuate members are laterally offset from one another.

12. The scraper assembly of claim 11, wherein the first and second scraping members are secured between the first and second arcuate members.

13. The scraper assembly of claim 11, wherein the first and second scraping members are secured to the first arcuate member and extend outwardly from the first arcuate member in a first lateral direction.

14. The scraper assembly of claim 13, comprising:
the third scraping member secured to the second arcuate member proximate to the first end of the support structure; and
a fourth scraping member secured to the second arcuate member proximate to the second end of the support structure;
wherein the third and fourth scraping members extend outwardly from the second arcuate member in a second lateral direction, opposite the first lateral direction.

15. A scraper assembly for an off-road vehicle comprising:
a support structure configured to couple to a frame of the off-road vehicle, wherein the support structure is configured to be positioned between a first wheel and a second wheel, and the support structure is configured to extend at least partially about a rotating assembly that supports the first wheel and the second wheel;
a first scraping member coupled to the support structure, wherein the first scraping member is configured to be positioned below a horizontal centerline of the rotating assembly and rearward of a vertical centerline of the rotating assembly, and the first scraping member is configured to remove debris from the rotating assembly at least while the rotating assembly is rotating in a first direction;
a second scraping member coupled to the support structure, wherein the second scraping member is configured to be positioned above the horizontal centerline of the rotating assembly and forward of the vertical centerline of the rotating assembly, and the second scraping member is configured to remove debris from the rotating assembly at least while the rotating assembly is rotating in a second direction, opposite the first direction; and
a third scraping member coupled to the support structure and positioned between the first scraping member and the second scraping member.

16. The scraper assembly of claim 15, wherein the first and second scraping members are configured to contact the rotating assembly while the rotating assembly is rotating in the first and second directions.

17. The scraper assembly of claim 16, wherein at least one of the first scraping member and the second scraping member is formed from an abradable material.

18. The scraper assembly of claim 15, wherein the support structure is substantially arcuate, the first scraping member is positioned proximate to a first end of the support structure, and the second scraping member is positioned proximate to a second end of the support structure.

* * * * *